US006587899B1

(12) United States Patent
Jarvi et al.

(10) Patent No.: US 6,587,899 B1

(45) Date of Patent: Jul. 1, 2003

(54) DYNAMIC MESSAGE INTERFACE

(75) Inventors: Jukka Jarvi, Puuppola (FI); Kimmo Poikolainen, Aanekoski (FI)

(73) Assignee: Nokia Corporation, Espoo (FI)

( * ) Notice: Subject to any disclaimer, the term of this patent is extended or adjusted under 35 U.S.C. 154(b) by 540 days.

(21) Appl. No.: 09/595,396

(22) Filed: Jun. 14, 2000

Related U.S. Application Data

(63) Continuation of application No. PCT/FI98/00973, filed on Dec. 11, 1998.

(30) Foreign Application Priority Data

Dec. 16, 1997 (FI) ................................................ 974532

(51) Int. Cl.[7] ........................ G06F 13/14; G06F 13/36; G06F 13/364

(52) U.S. Cl. .............................. 710/33; 710/5; 710/16; 710/36; 710/41

(58) Field of Search ............................... 710/5, 16, 33, 710/36, 41

(56) References Cited

U.S. PATENT DOCUMENTS 4,564,937 A * 1/1986 Perry et al. ................. 370/374
4,606,002 A 8/1986 Waisman et al.
5,003,508 A 3/1991 Hall
5,390,233 A * 2/1995 Jensen et al. ............... 455/417
5,477,541 A 12/1995 White et al.
5,649,185 A * 7/1997 Antognini et al. ............. 707/9
5,850,449 A * 12/1998 McManis .................... 713/161
5,936,972 A * 8/1999 Meidan et al. .............. 714/712
6,044,415 A * 3/2000 Futral et al. .................. 710/33

FOREIGN PATENT DOCUMENTS

| | | |
|---|---|---|
| EP | 0351233 A2 | 1/1990 |
| EP | 0763954 A1 | 3/1997 |
| FI | A 971621 | 10/1997 |
| GB | 2213024 A | 8/1989 |
| WO | WO 94/18766 | 8/1994 |
| WO | WO 97/10551 | 3/1997 |

OTHER PUBLICATIONS

International Search report for PCT/FI98/00973.

* cited by examiner

*Primary Examiner*—Jeffrey Gaffin
*Assistant Examiner*—Rehana Perveen
(74) *Attorney, Agent, or Firm*—Squire, Sanders & Dempsey LLP

(57) ABSTRACT

In a telephone exchange the functional units of call control communicate by way of a common message bus. If a unit wants to know only one thing from the data of a message, then due to the fixed structure of the message all other data contained in the message must also be received. Unnecessary data is thus transmitted in the message bus. The procedure according to the invention is such that the service requester states in the request message exactly what it wants to know. Since the data structure of the service provider, that is, the position of each individual data and the length of the data field, is known to the service requester, only those entries of the data structure are stated in the request message where the requested data is located. The service provider fetches only this data from its data structure and sends it in the reply message to the message bus. Thus, both the request message and the reply message form a dynamic message pair.

6 Claims, 3 Drawing Sheets

| HEADER | POSITION a | LENGTH l1 | POSITION b | LENGTH l2 | POSITION c | LENGTH l3 | POSITION d | |
|---|---|---|---|---|---|---|---|---|

Fig. 4

DYNAMIC MESSAGE INTERFACE

This is a continuation of PCT/FI98/0097 filed Dec. 11, 1998.

FIELD OF THE INVENTION

The invention concerns exchange of messages in telecommunication equipment, where several processes communicate with one another through a common message bus.

TECHNICAL BACKGROUND

In relatively complex distributed equipment environments, such as telecommunication equipment and computer systems, a rack is used into which sub-racks are pushed. The sub-racks again contain several plug-in units, each one formed by a circuit board and its components. The rack contains a backplane having different backplane buses. The purpose of these is to connect the different units electrically and mechanically with each other and to allow quick communication between the units. Backplane buses are also used in systems formed by several equipment sub-racks, such as e.g. in the nodal equipment of a digital telecommunication system, where data and clock signals must be transmitted between equipment sub-racks.

An example of a complex piece of nodal equipment of this kind is the telephone exchange. FIG. 1 is a reduced block diagram of a telephone exchange. Subscriber lines are connected to the exchange through a subscriber line interface unit, which in the case of an analog subscriber line performs AD conversion and adapts the signalling on the subscriber line to be suitable for the exchange. On the other side of the exchange there are e.g. 2 Mbit/s trunk line interfaces performing the electric interface and synchronising interface between the trunk lines and the exchange. The switching field performs switching of a call in such a way that a certain subscriber line channel is connected with a certain trunk line channel. Signalling channels and internal data channels of the exchange are also connected through the switching field.

The call control determines how calls are connected through the switching field. The call control is the heart of the system and, depending on the size of the exchange, it contains a large number of different distributed call control functions, of which just a few are shown in FIG. 1. The call control is responsible for all decision-making. The O&M (Operation and Maintenance) processes such functions which relate to the operation and maintenance of the exchange and through this the operator is in connection with the exchange by using MML (Man Machine Interface) language.

As an example of distributed call control functions the SSIG (Subscriber Signalling) unit may be mentioned, which controls signalling on the subscriber line and generates the charging pulses of the subscriber's call. The signalling relating to trunk line channels is performed by a LSIG (Line Signalling) unit. Signalling in accordance with CCITT No. 7 on trunk lines is performed by a common channel signalling (C SSIG) unit. Big exchanges have a charging unit CHARG, which collects and stores the call-specific data needed for charging for the call. A statistics unit STAT collects and stores the data relating to traffic and charging. The Central Memory includes semi -permanent data including subscriber data, charging information, signalling and routing information and the configuration data of the All the units mentioned above are formed by plug-in units, the card of which is provided at least with a CPU processor, a DC/DC converter and the necessary memories. The units are interconnected through a common message bus, and for this purpose the units have a message bus interface unit attending to the matching of the unit and the message bus to one another.

The communication between units or, more exactly, between their CPU processors, takes place on a message basis: when a unit needs a service from another unit, it will send a service request message, in response to which this other unit will send a return message. Some information may be requested in the request message or the other unit is asked to perform some functions and to send the results in the reply message. For example, the SSIG (Subscriber Signalling) unit requests subscriber information of the central memory and in response to the request the central unit sends subscriber information through the message bus. In this case, the SSIG requests the service while the central memory renders the service. In this way, each unit may both render a service to the other units and request a service from the others.

The request and the form and structure of the reply message are exactly defined. The request message and the return message form a message couple, the structure of which always remains the same. Obviously, since there are so many units, there are also many message couples however, each couple being exactly defined in advance.

Due to the solidity of message pairs, that is, due to the message interface, both the service provider's and the service requester's views of the service are the same. The requester knows exactly what services are offered and what is the structure of the service. It is assumed with reference to FIG. 2 that the service requester, e.g. SSIG, only wants to know if subscriber A has call forwarding. The length of this information is e.g. one byte. It knows that this information is included in a certain service, so it sends such a standard message to this service, in whose message couple of a standard structure it knows the concerned information to be included. The service provider searches the whole file wherein the requested information is included and sends it to the service requester. In the return message the requester does receive the one piece of information which it needs, but, in addition, it also receives all possible subscriber information about subscriber A or at least the information known to the service provider. Since the message structure is entirely determined, the subscriber signalling unit SSIG knows how to distinguish the information it wants from the information in the message.

A problem of the present message communication emerges from the examples mentioned above. In order to learn only one thing from the return message, the service requester, due to the fixed structure of the message, must receive also all other information included in the return message, even if it does not need that information. In order to get to know just one byte, 1000 bytes must be received in the case described in our example. As a result of this, a very large quantity of unnecessary information is transmitted on the message bus. This loads the bus unnecessarily and may result in a situation where the message bus will become a bottleneck in the operation of the exchange.

It is true that it is possible in systems of today to reduce the load on the message bus by creating new fixed message pairs, wherein the reply messages contain only the information specified in the request message. However, this is a cumbersome method, since the number of message pairs grows to become very high and, in addition, corresponding changes must be made in the programme code of the service provider and producer. In addition, changes must be made in that interface behind which the common information structures of all units are located and which all units perceive as the same.

It is an objective of this invention to bring about an arrangement where drawbacks of the present arrangement do not occur. The established objective is achieved by a system the characteristic features of which are presented in the independent claims.

BRIEF SUMMARY OF THE INVENTION

The procedure according to the invention is such that the service requester states exactly in the request message what it wants to know. As the service requester knows the information structure of the service provider, that is, the position and data field length of each individual piece of information are known, only the position and length are stated in the request message. When the service provider has received the request message, it moves the pointer to the stated position and reads data from thereon forward for as long as the defined data field length. Thereupon it forms a reply message and places only this specified piece of information therein. If the service requester has stated several positions and lengths in his request message, the service provider will fetch this information only from its data structure and send it in the reply message to the message bus. Thus both the request message and the reply message form a dynamic message pair. When it is desired to send the whole service, the whole message is sent fixedly structured, as is done also in state-of-the-art systems, but when a partial service is requested, the messages have a dynamic structure and length which are known to the service requester and provider.

This arrangement has numerous advantages: the load on the message bus is reduced to a fraction of the present load and the load on the CPU processors of the units is also reduced. Even for providing a big service just one dynamic message couple is sufficient, and the service provider may concentrate in its code on showing with one message the entire available service to the other units. It is not necessary to tailor any individual view for each service requester, but the service provider may show that this is all I know, you may ask what you like.

BRIEF DESCRIPTION OF THE DRAWINGS

The invention will be described in greater detail with the aid of the appended schematic drawings, wherein

FIG. 4 illustrates the structure of the request message.

DETAILED DESCRIPTION OF THE INVENTION

Figure 3:
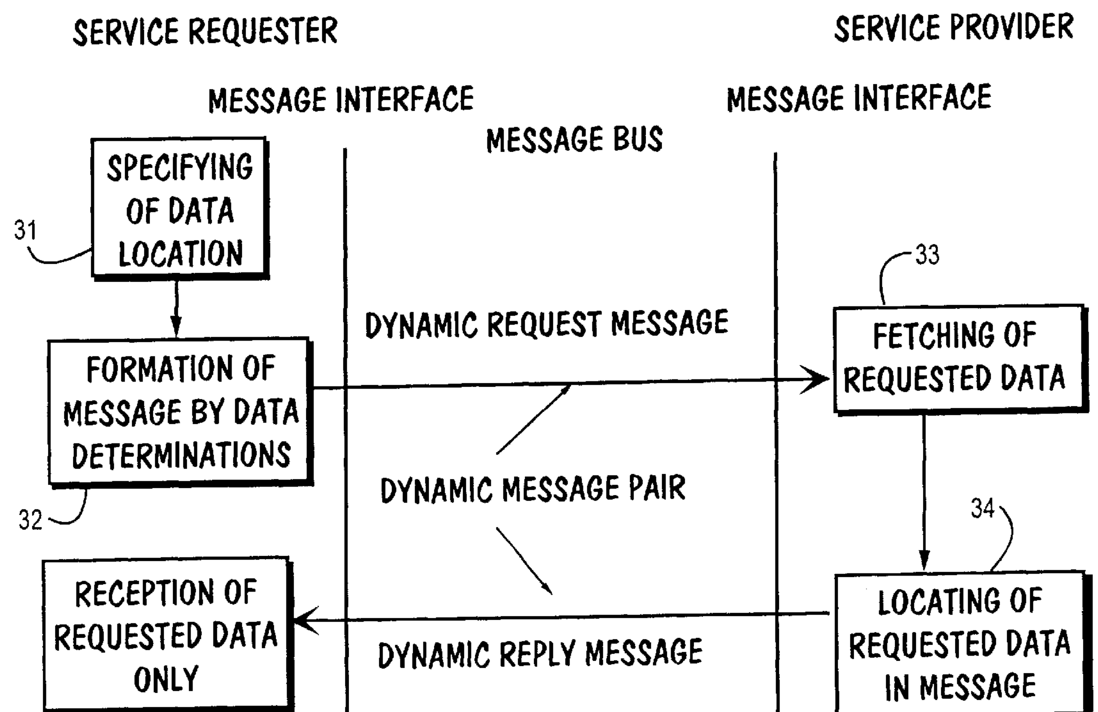
FIG. 3 shows a message exchange in accordance with the invention.

FIG. 3 shows the events in the order according to the invention. When the service requester wants only some specific information, it must state exactly to the service provider what it wants. On the other hand, the service requester must know what information the service provider has to offer. In fact it knows this, because the messages have common environment definitions (cf. the include files of the C language), that is, the messages are described as a general and common structure, which is linked during the compilation step, so that it can be seen by all service requesters. All messages are thus visible to all when required. The complete message is a complete copy of the service structure, so the service requester knows what information content there is in each field and it knows the location and length of the field.

Under these circumstances, when the service requester needs certain information only, it identifies those fields in the complete service structure, the values of which it wants returned, that is, where the updated information is located, the position of fields and the lengths of fields, step 31. These data definitions it locates in the dynamic request message.

Figure 4:
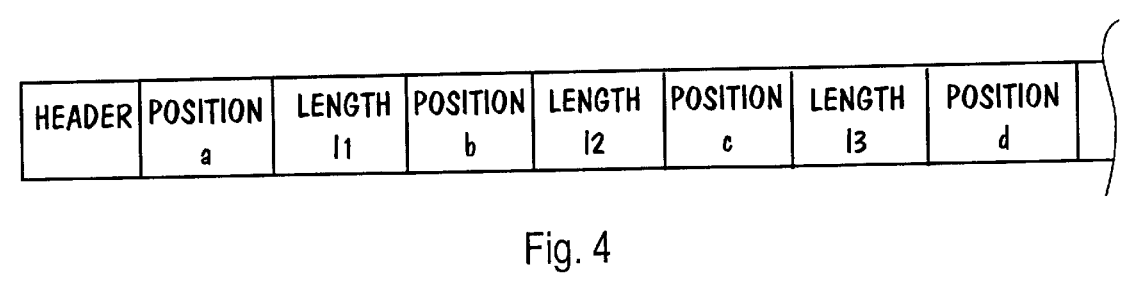

FIG. 4 outlines a possible request message. It has one or more heading fields, where the receiver, that is, the service provider, and the sender are identified. These are followed by fields where the first desired piece of information is identified by stating the position of the information location, e.g. by giving the initial entry in bytes counting from the start of the data part of the complete message and the field length in bytes. Thus, the first data is identified by position a and length l1, the second data is identified by position b and length l2, the third data by position c and length l3 etc. The number of position-length couples in the request message may vary freely, so the message is dynamic.

When the service requester has formed the message it desires, it sends it through the message bus to the receiver, step 32 in FIG. 3. The receiver separates the position-length couples from the message and fetches that data from the complete message structure in the memory, which begins from the positions given in the received message and the length of which is the given field length, step 33. The field position will be known when the offset of the data part of the stored complete message is deducted from the offset of the desired field. For this to be possible, the structure of the file in the memory must be uniform.

It locates the fields fetched from memory in the reply message, e.g. in the same order as the one in which they were requested in the request message, step 34. It is also possible to locate the position/length couples in the reply message and to locate after each couple the data of the corresponding field fetched from memory. Finally, it sends the message it has formed through the message bus to the service requester. Thus, also the reply message is dynamic and of a varying length. The request message and the reply message thus form a dynamic message couple.

It was assumed in the above description that the service provider has wanted to know the data of the whole field, that is, the length indicator was the length of the whole field. However, a field may have a length of several bytes and it may contain several data elements, of which the service requester would want to know only one. By setting suitable position-length indicators it is possible to refer to any data element in the data structure.

By using the described arrangement the operator can cope with just minor programme changes. If the requester wants to know e.g. only one more field from the existing service, the requester need only add the basic data of this field to its request. Thus only one change in the programme is required, whereas in a state-of-the-art solution changes must be made both in the message itself, that is, the common environment definitions change, and also in the service provider's code. Fields may be added and changes may be made in the reply message by the same rules as in state-of-the-art systems. When it is desired to request the whole service, the whole message is sent fixedly structured, as is done also at present. When requesting a partial service, the messages have a dynamic structure and length in accordance with the invention, which are known to the service requester and to the service provider.

The proposed method can be applied directly to the known PLM and C programming languages (=Intel's own language) and also to all other languages, which have a data structure of the same kind. Hereby a reference to position and length is enough. If this is not possible, the fields of the message may be numbered consecutively, whereby the service requester refers in its request message to fields e.g. as follows: give data 1, 4, 7 and 9. Hereby the length of fields need not be stated at all. Another possibility is to describe the fields of the complete message like a bit map, whereby such a bit map is sent in the request message where e.g. the number one means those fields whose data content is desired.

Figure 1:
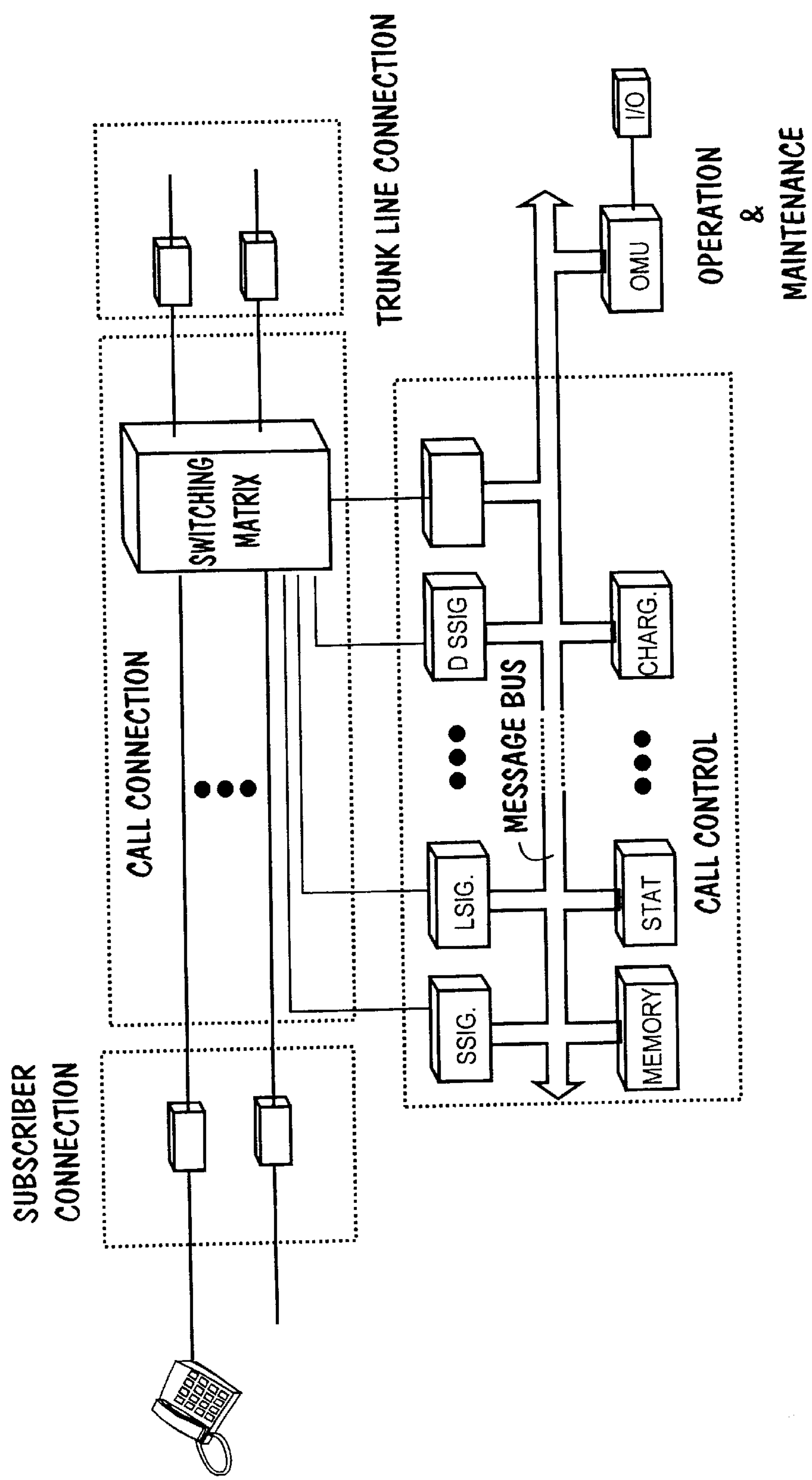
FIG. 1 shows functional blocks of a telephone exchange.
Figure 2:
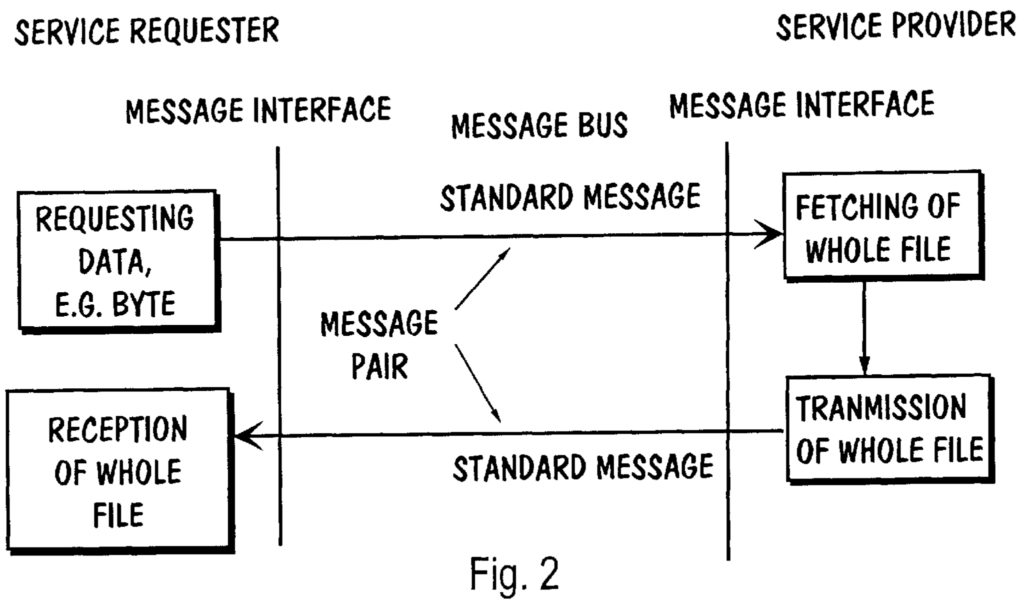
FIG. 2 shows a state-of-the-art exchange of messages.

According to FIG. 1, the exchange has an operation & maintenance unit OMU, through which the operator manages the exchange. Through this connection the operator monitors the message bus to find out what kind of messages are moving in the bus. This is easy in state-of-the-art systems, because the structure of messages is fixed and known beforehand. It is hereby possible from the bit flow to separate different fields from each other. This monitoring duty is made more difficult by the formation of a dynamic message in accordance with the invention. However, monitoring is possible in several different ways. These will be described in the following.

It does not emerge directly from the monitored request messages what service has been requested. When the operator takes a copy for himself of a fully dimensioned message from the service provider, he is able on the basis of the position/length data of the request message to find out the requested data and what data the reply message contains and in what kind of structure it is sent.

Another method is such that the position/length data of the request message is copied in the beginning of the reply message before the actual data part. Hereby the structure of the monitored reply message can be found out from the data in the first part. The number of position/length data can be limited e.g. to ten, whereby when more than 10 partial data is requested from the service, the reply message must be sent in its entirety. This is advantageous, if it is not desirable to stress the service provider with several small separate requests.

A third method is to use a bit map which travels in the beginning of both the request message and the reply message and which thus identifies the requested fields travelling in the reply message. The bit map should hereby be generated automatically on the basis of requested partial data, so that it is not necessary to edit the map beforehand and it thus not sensitive to changes taking place in the service structure.

A fourth method is to use a procedure where a special form is made of the complete service, which form is the message structure in an opened state. The form is known to the service requester and from this it obtains the position and length data it needs in the request message. The basic principles of this method are described in the applicant's earlier Patent Application FI-971621.

What is claimed is:

1. Method of transmitting data in message form in telecommunication equipment including several functional units, of which at least some provide a service to the other units and at least some use the provided service a common message bus to which the functional units are connected and through which the unit requesting a service sends its request message to the unit providing the service and the unit providing the service sends a reply message to the unit requesting the service, wherein the unit providing the service includes a uniform structured memory file consisting of at least one data structure and each data structure consisting of at least one field, and the unit requesting the service identifies those pieces of data of the uniform structured memory file which it needs, characterized in that composing from the request message and the reply message a dynamic message pair for use of the units, each pair consisting of the varied length request message and the varied length reply message, including at least one identifier into the request message, each identifier identifying a piece of data of the uniform structured memory file, including the identifiers and the pieces of data determined by the identifiers into the reply message.

2. Method as defined in claim 1, characterized in that the identifier consists of position and length so that the position refers to any data element of the uniform structured memory file, and the length discloses the amount of the data elements.

3. Method as defined in claim 1, characterized in that the identifier is a bit value in a bit map, and the bit map includes one bit value per each data structure field of the uniform structured memory file.

4. Telecommunication equipment including several functional units, of which at least some provide a service to the other units and at least some use the provided service a common message bus to which the functional units are connected and through which the unit requesting a service sends its request message to the unit providing the service and the unit providing the service sends a reply message to the unit requesting the service, the unit providing the service includes a uniform structured memory file consisting of at least one data structure and each data structure consisting of at least one field, the unit requesting the service identifies those pieces of data of the uniform structured memory file which it needs, characterized in that the units use a dynamic message pair consisting of the varied length request message and the varied length reply message, the request message including at least one identifier, each identifying a piece of data of the uniform structured memory file, the reply message including the identifiers and the pieces of data determined by the identifiers.

5. Telecommunication equipment as defined in claim 4, characterized in that the identifier consists of position and length so that the position refers to any data element of the uniform structured memory file, and the length discloses the amount of the data elements.

6. Telecommunication equipment as defined in claim 4, characterized in that the identifier is a bit value in a bit map, and the bit map includes one bit value per each data structure field of the uniform structured memory file.

* * * * *